US012804490B2

(12) United States Patent

Lin et al.

(10) Patent No.: US 12,804,490 B2
(45) Date of Patent: Nov. 17, 2026

(54) SLICE-BASED CELL RESELECTION METHOD AND RELATED DEVICE

(71) Applicant: CHINA TELECOM CORPORATION LIMITED, Beijing (CN)

(72) Inventors: Pei Lin, Beijing (CN); Shuo Peng, Beijing (CN); Jiaxiang Liu, Beijing (CN); Zheng Jiang, Beijing (CN); Xiaoming She, Beijing (CN)

(73) Assignee: CHINA TELECOM CORORATION LIMITED, Beijing (CN)

(*) Notice: Subject to any disclaimer, the term of this patent is extended or adjusted under 35 U.S.C. 154(b) by 366 days.

(21) Appl. No.: 18/292,055

(22) PCT Filed: Jul. 8, 2022

(86) PCT No.: PCT/CN2022/104689
§ 371 (c)(1),
(2) Date: Mar. 19, 2024

(87) PCT Pub. No.: WO2023/005644
PCT Pub. Date: Feb. 2, 2023

(65) Prior Publication Data

US 2024/0349143 A1 Oct. 17, 2024

(30) Foreign Application Priority Data

Jul. 27, 2021 (CN) ......................... 202110849474.3

(51) Int. Cl.
*H04W 36/00* (2009.01)
*H04W 36/08* (2009.01)
(Continued)

(52) U.S. Cl.
CPC ....... *H04W 36/08* (2013.01); *H04W 36/0061* (2013.01); *H04W 72/02* (2013.01); *H04W 72/0453* (2013.01); *H04W 72/563* (2023.01)

(58) Field of Classification Search
CPC ............. H04W 36/08; H04W 36/0061; H04W 72/563; H04W 72/02; H04W 72/0453
See application file for complete search history.

(56) References Cited

U.S. PATENT DOCUMENTS

| | | | |
|---|---|---|---|
| 2020/0012547 A1 | 1/2020 | Yamawaki et al. |
| 2020/0120547 A1 | 4/2020 | Han et al. |

(Continued)

FOREIGN PATENT DOCUMENTS

| | | |
|---|---|---|
| CN | 111386727 A | 7/2020 |
| CN | 111866991 A | 10/2020 |

(Continued)

OTHER PUBLICATIONS

Provisional application 62-706253, filed Aug. 6, 2020, corresponding to US 2023/0276324 A1. (Year: 2020).*

(Continued)

*Primary Examiner* — Melvin C Marcelo
(74) *Attorney, Agent, or Firm* — Perilla Knox & Hildebrandt; Kenneth A. Knox

(57) ABSTRACT

A method for slice-based cell reselection includes: obtaining network slice information and slice-based cell reselection information; deriving a first priority frequency for slice-based cell reselection according to the network slice information and the slice-based cell reselection information; performing cell reselection on the first priority frequency for slice-based cell reselection; and identifying a suitable cell for camping on the first priority frequency for slice-based cell reselection.

19 Claims, 4 Drawing Sheets

(51) Int. Cl.

| | |
|---|---|
| ***H04W 48/18*** | (2009.01) |
| ***H04W 72/02*** | (2009.01) |
| ***H04W 72/0453*** | (2023.01) |
| ***H04W 72/563*** | (2023.01) |

(56) References Cited

U.S. PATENT DOCUMENTS

| | | | | |
|---|---|---|---|---|
| 2023/0276324 | A1* | 8/2023 | Sebire | H04W 36/08 370/331 |
| 2023/0292202 | A1* | 9/2023 | Jung | H04W 36/08 |
| 2024/0007919 | A1 | 1/2024 | Liu | |

FOREIGN PATENT DOCUMENTS

| | | | |
|---|---|---|---|
| CN | 112042225 | A | 12/2020 |
| CN | 112425205 | A | 2/2021 |
| JP | 2020505890 | A | 2/2020 |
| WO | 2021143900 | A1 | 7/2021 |

OTHER PUBLICATIONS

Extended European Search Report for EP Patent Application No. 22848249.3 of Jun. 18, 2025.
3GPP, Study on Enhancement of Radio Access Network (RAN) Slicing (Release 17), 3GPP TR 38.832, V1.0.0, Mar. 2021.
3GPP TSG-RAN WG2 #111-e, "Consideration on RAN Slicing," vivo, Agenda Item: 8.8, Document R2-2007302, Aug. 17-28, 2020.
First Office Action for CN Patent Application No. 2021108494743.
International Search Report for International Application No. PCT/CN2022/104689.
3GPP TSG-RAN WG2 Meeting#114 e R2-2106501—Summary of [AT114-e][250][Slicing] Usage of slice priorities for cell reselection (Lenovo).
First Office Action for JP Patent Application No. 2024-504836 of Feb. 25, 2025.
3GPP TSG-RAN WG2 Meeting #114-e, "Discussion on slice based cell reselection," CMCC, R2-2106224, electronic meeting, May 19-27, 2021.

* cited by examiner

SLICE-BASED CELL RESELECTION METHOD AND RELATED DEVICE

CROSS REFERENCE TO RELATED APPLICATIONS

The present application is a National Stage Application of International Application No. PCT/CN2022/104689 filed on Jul. 8, 2022 which claims priority to Chinese Patent Application No. 202110849474.3 entitled "Method for slice-based cell reselection and related device", filed on Jul. 27, 2021, and the entire contents of both of which are incorporated herein by reference for all purposes.

TECHNICAL FIELD

The present disclosure relates to the field of communication technology, and in particular, to a method for slice-based cell reselection, a user equipment, an electronic device, and a computer-readable storage medium.

BACKGROUND

3GPP (3rd Generation Partnership Project) introduces a network slice (hereinafter referred to as slice) technology in the 5G technology (5th Generation Mobile Communication Technology), which provides differentiated services for a user through a sliced service quality assurance system.

It should be noted that the information disclosed in the above background part is only used to enhance the understanding of the background of the present disclosure.

SUMMARY

According to embodiments of the present disclosure, there is provided a method for slice-based cell reselection, an electronic device, and a non-transitory computer-readable storage medium.

Other features and advantages of the present disclosure will become apparent from the following detailed description, or may be learned partially by the practice of the present disclosure.

According to embodiments of the present disclosure, there is provided a method for slice-based cell reselection performed by user equipment, and the method includes: obtaining network slice information and slice-based cell reselection information; deriving a first priority frequency for slice-based cell reselection according to the network slice information and the slice-based cell reselection information; and performing cell reselection on the first priority frequency for slice-based cell reselection, and identifying a suitable cell for camping on the first priority frequency for slice-based cell reselection.

According to embodiments of the present disclosure, there is provided a non-transitory computer-readable storage medium, and the computer-readable storage medium stores a computer program; when the computer program is executed by a processor, a method for slice-based cell reselection as described in the above embodiments is implemented.

According to embodiments of the present disclosure, there is provided an electronic device, including: one or more processors; and a storage apparatus, configured to store one or more programs; when the one or more programs are executed by the one or more processors, the one or more processors are enabled to implement the method for slice-based cell reselection as described in the above embodiments.

It should be understood that the above general description and the following detailed description are merely exemplary and explanatory, and cannot limit the present disclosure.

BRIEF DESCRIPTION OF THE DRAWINGS

The accompanying drawings here, which are incorporated in and constitute a part of the description, illustrate embodiments consistent with the disclosure and together with the description serve to explain the principles of the present disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
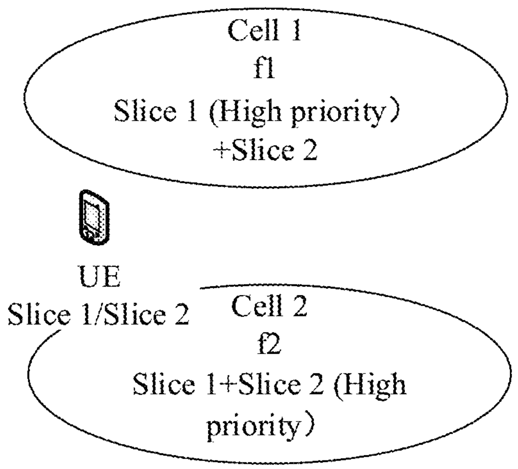
FIG. 1 shows a schematic diagram of a problem of selecting a frequency for camping that supports a plurality of service slice.

Example embodiments will now be described more fully with reference to the accompanying drawings. Example embodiments, however, can be implemented in various forms and should not be construed as limited to the embodiments set forth here; by contrast, these embodiments are provided so that the present disclosure will be thorough and complete, and will fully convey the concept of example embodiments to those skilled in the art.

Furthermore, the described features, structures, or characteristics may be combined in any suitable manner in one or more embodiments. In the following description, numerous specific details are provided to give a thorough understanding of embodiments of the present disclosure. However, those skilled in the art will recognize that the technical solutions of the present disclosure may be practiced without one or more of specific details, or other methods, components, apparatuses, steps, etc., may be employed. In other instances, commonly-known methods, apparatuses, implementations, or operations are not shown or described in detail to avoid obscuring aspects of the present disclosure.

The block diagrams shown in the drawings are merely functional entities, and do not necessarily correspond to physically independent entities. That is, these functional entities may be implemented in the form of software, or these functional entities may be implemented in one or more hardware modules or integrated circuits, or these functional entities may be implemented in different networks and/or processor apparatuses and/or microcontroller apparatuses.

The flowchart shown in the accompanying drawings is merely an exemplary description, and does not necessarily include all content and operations/steps, nor must be executed in the described sequence. For example, some of the operations/steps may also be decomposed, while some of the operations/steps may be combined or partially merged. Therefore, the actual execution sequence may be changed according to actual situations.

In particular, the processes described below with reference to the flowchart may be implemented as computer software programs according to embodiments of the present disclosure. For example, embodiments of the present disclosure include a computer program product which includes a computer program carried on a computer-readable storage medium; and the computer program includes program code for performing the method shown in the flowchart.

It should be noted that the computer-readable storage medium shown in the present disclosure may be a computer-readable signal medium or a computer-readable storage medium, or any combination of the above. The computer-readable storage medium may be, for example, but is not limited to, an electrical, magnetic, optical, electromagnetic, infrared, or semiconductor system, apparatus, or device, or any combination of them. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM) or flash memory, an optical fiber, a portable compact disk read-only memory (CD-ROM), an optical storage device, a magnetic storage device, or any suitable combination of them. In the present disclosure, the computer-readable storage medium may be any tangible medium that includes or stores a program that may be used by or in connection with an instruction execution system, apparatus, or device. In the present disclosure, the computer-readable signal medium may include a data signal propagated in a baseband or as part of a carrier, where a computer-readable program code is carried. Such a propagated data signal may take a variety of forms, including, but not limited to, an electromagnetic signal, an optical signal, or any suitable combination of them. The computer-readable signal medium may also be any computer-readable storage medium other than a computer-readable storage medium, and the computer-readable storage medium may send, propagate, or transmit a program for use by or in connection with an instruction execution system, apparatus, or device. The program code contained on the computer-readable storage medium may be transmitted by any suitable medium, including but not limited to: wireless, an electric wire, an optical cable, radio frequency (RF), etc., or any suitable combination of them.

The flowchart and block diagrams in the drawings illustrate the system architecture, function, and operation of possible implementations of methods, apparatuses, and computer program products according to various embodiments of the present disclosure. In this regard, each block in the flowchart or block diagrams may represent a part of a module, program segment, or code, which includes one or more executable instructions for implementing the specified logical function. It should also be noted that, in some alternative implementations, the functions noted in the blocks may occur in a sequence different from that noted in the drawings. For example, two blocks represented in succession may, in fact, be executed substantially in parallel, which may sometimes be executed in the reverse sequence, depending upon the function involved. It should also be noted that each block in the block diagrams or flowchart, and combinations of blocks in the block diagrams or flowchart, may be implemented by dedicated hardware-based systems that perform the specified functions or operations, or may be implemented by combinations of dedicated hardware and computer instructions.

The involved units described in the embodiments of the present disclosure may be implemented in a software manner, or may be implemented in a hardware manner. The described units may also be disposed in a processor. Among them, the names of these units do not constitute a limitation on the unit itself under certain circumstances.

Figure 3:
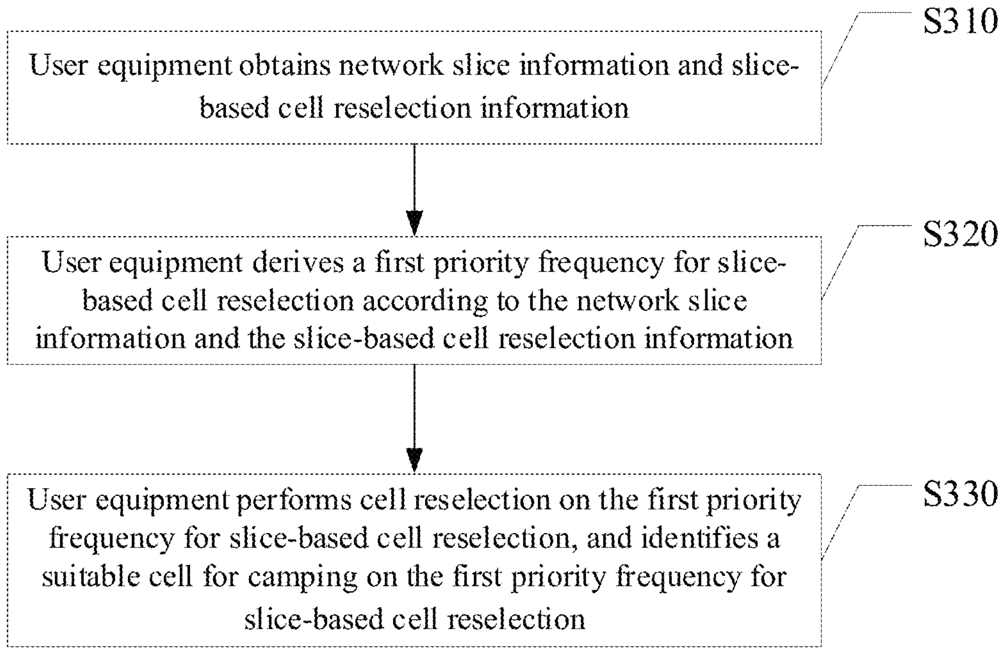
FIG. 3 schematically shows a flowchart of a method for slice-based cell reselection according to an embodiment of the present disclosure.
Figure 4:
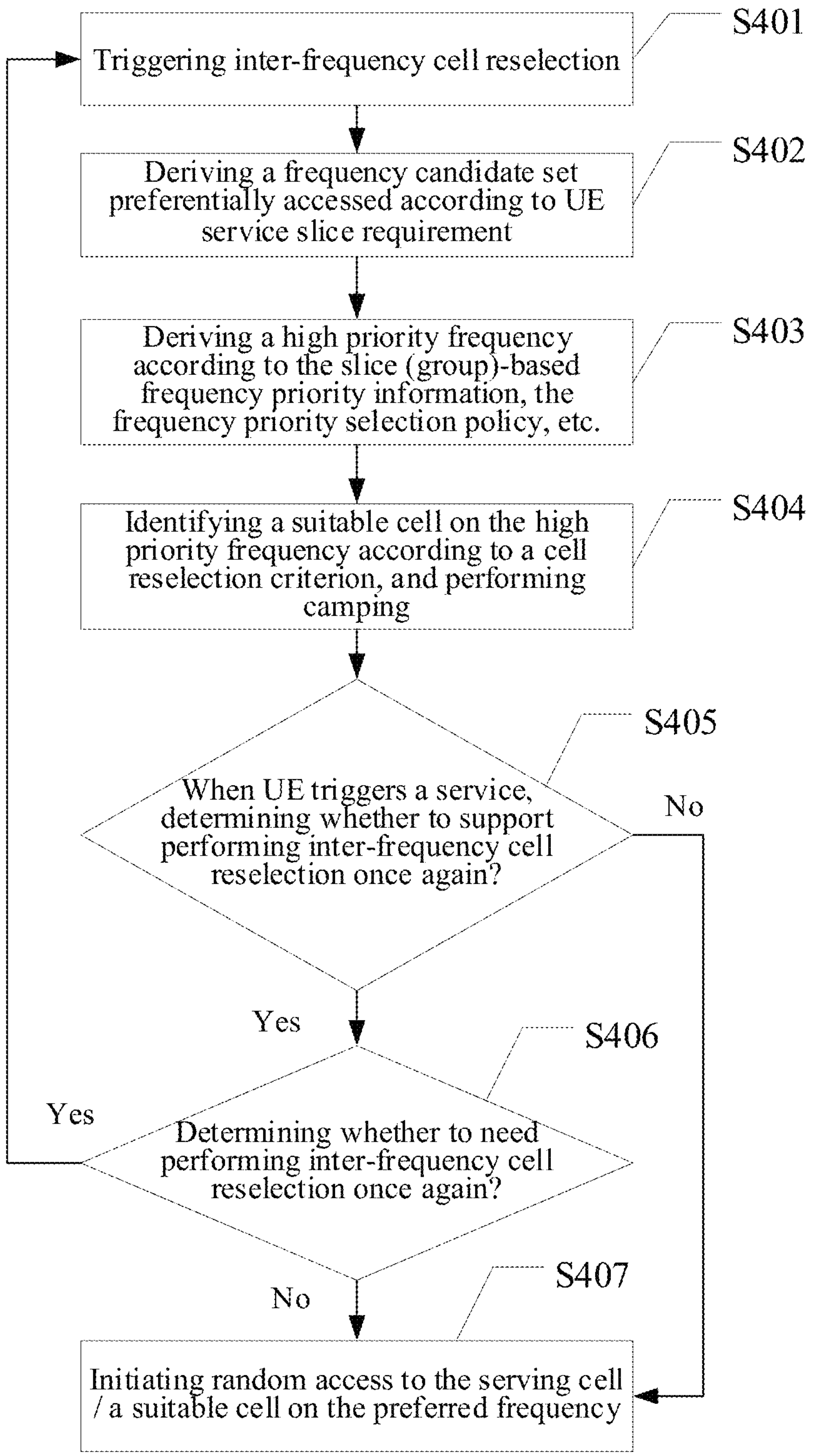
FIG. 4 schematically shows a flowchart of a method for slice-based cell reselection according to another embodiment of the present disclosure.

In another aspect, the present disclosure further provides a computer-readable storage medium. The computer-readable storage medium may be included in the electronic device described in the foregoing embodiments, or may exist alone, but is not assembled into the electronic device. The computer readable storage medium carries with one or more programs. When the one or more programs are executed by an electronic device, the electronic device implements the method described in the following embodiments. For example, the electronic device may implement various steps as shown in FIG. 3 or FIG. 4.

The 5G network slice technology has a certain limitation, and is more focused on a core network. The number of core network slices may be large, but the number of radio access network slices (referred to as RAN slice) is limited due to limited resources and other reasons. A RAN slice may correspond to a plurality of core network slices.

In order to improve the capability perception of the radio access network and provide more differentiated service quality assurance for a user, a research on RAN slice enhancement technology is performed, in which the problems of rapid access of user equipment (UE), service continuity assurance, or the like are mainly solved.

At present, the enhancement project for radio access network slice is still in a discussion stage, and related technical solutions and details have not been agreed, and further research needs to be performed.

Therefore, there is a need for a new method for slice-based cell reselection, a user equipment, an electronic device, and a computer-readable storage medium.

One of the problems to be solved by the embodiments of the present disclosure is the problem of deriving a slice-based cell reselection frequency priority.

Firstly, for a slice-based cell reselection mechanism, it is necessary to study how the UE derives a high priority frequency (such as the first priority frequency for slice-based cell reselection, the second priority frequency for slice-based cell reselection, the priority frequency for the first slice, and the third priority frequency for slice-based cell reselection mentioned below) by using the slice (group) information indicated by a network side (i.e. a network device referred to below), the slice (group)-based frequency priority information (hereinafter referred to as a slice-based cell reselection frequency priority) in combination with traditional frequency priority information (hereinafter referred to as a cell reselection frequency priority), and further identifies a suitable cell for camping (such as the first cell and the second cell mentioned below), especially when the UE supports a plurality of slice services; as shown in FIG. 1, it is assumed that a certain UE supports services of slice 1 and slice 2 simultaneously. For the slice-based cell reselection mechanism, especially when the UE supports a plurality of slice services, how to reasonably select the frequency for camping (such as the first priority frequency mentioned below), is to implement quick access based on a slice (group).

A second problem to be solved by the method provided in the embodiments of the present disclosure is the fairness problem of slice remapping.

Figure 2:
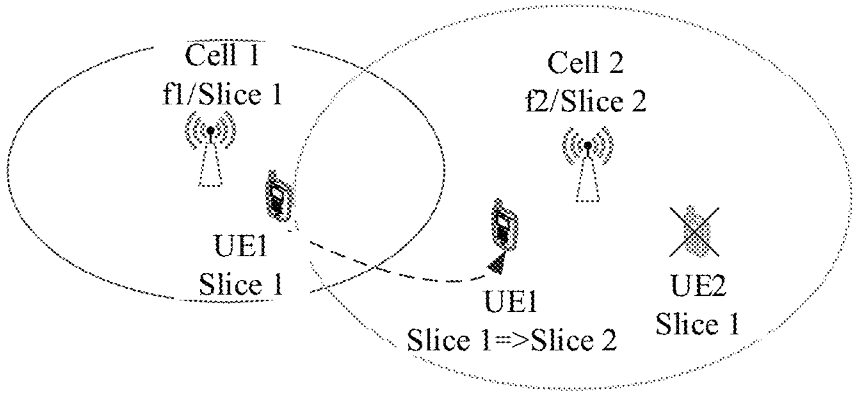
FIG. 2 shows a schematic diagram of a fairness problem of slice remapping.

Secondly, the fairness problem that the network provides services for users is considered. As shown in FIG. 2, it is assumed that UE 1 initiates a service of slice 1 in cell 1; when UE 1 moves to cell 2, since cell 2 does not support slice 1, the service of slice 1 can be mapped to slice 2 through a slice remapping mechanism, so that the service continuity in the UE mobility process is ensured, which is also a scene being discussed in R17 RAN slice. For UE 2 initiating a service of slice 1 currently in the coverage area of cell 2, since cell 2 does not support slice 1, UE 2 may be switched or redirected to other cells by cell 2, resulting in a certain time delay:

On the other hand, the initial access service of slice 1 cannot be remapped to slice 2. Compared with UE 1 switched to cell 2, this mechanism cannot provide fairness services for services of the same type of different users. At present, the slice remapping mechanism for assuring service continuity discussed in R17 is not suitable for an initial access scene, cannot provide fairness services for services of the same type of different users, and needs consideration of further optimization.

FIG. 3 schematically shows a flowchart of a method for slice-based cell reselection according to an embodiment of the present disclosure. The method provided in the embodiment of FIG. 3 may be performed by any UE.

As shown in FIG. 3, the method provided in the embodiment of the present disclosure may include the following steps.

In step S310, the user equipment obtains network slice information and slice-based cell reselection information.

In some embodiments, the network slice information may include an identifier of a network slice (group) that the user equipment is allowed to access and a corresponding network slice priority for cell reselection. The slice-based cell reselection information may include an identifier of a network slice or a slice group supported on a corresponding frequency and a corresponding slice-based cell reselection frequency priority.

Furthermore, the user equipment may further obtain a cell reselection frequency priority of each frequency.

In the current cell reselection mechanism of the new radio (NR, global 5G standard involved in the new air interface) system, the network side may indicate absolute frequency priority information of an inter-frequency or an inter-system frequency through IE CellReselectionPriority (cell reselection priority, for example, the value of which may be 0) to 7, where 0 represents the lowest priority) and CellReselectionSubPriority (cell reselection sub-priority, for example, the value of which may be 0.2, 0.4, 0.6, or 0.8) in system information. In the embodiments of the present disclosure, the absolute frequency priority information of an inter-frequency or an inter-system frequency is referred to as traditional frequency priority information, also referred to as cell reselection frequency priority.

In step S320, the user equipment derives a first priority frequency for slice-based cell reselection according to the network slice information and the slice-based cell reselection information.

In some embodiments, deriving the first priority frequency for slice-based cell reselection according to the network slice information and the slice-based cell reselection information by the user equipment may include: deriving a first candidate frequency for slice-based cell reselection according to the network slice information and the slice-based cell reselection information by the user equipment; if the first candidate frequency for slice-based cell reselection derived by the user equipment is a single frequency, selecting the first candidate frequency for slice-based cell reselection as the first priority frequency for slice-based cell reselection; if the first candidate frequency for slice-based cell reselection derived by the user equipment is a plurality of frequencies, deriving the first priority frequency for slice-based cell reselection from a plurality of first candidate frequencies for slice-based cell reselection according to the network slice information and the slice-based cell reselection information.

In some embodiments, deriving the first candidate frequency for slice-based cell reselection according to the network slice information and the slice-based cell reselection information by the user equipment may include: if there is a frequency that supports all network slices (groups) that the user equipment is allowed to access, taking the frequency that supports the all network slices (groups) that the user equipment is allowed to access as the first candidate frequency for slice-based cell reselection; if there is no frequency that supports all network slices (groups) that the user equipment is allowed to access, selecting a frequency that supports a part of network slices (groups) that the user equipment is allowed to access as the first candidate frequency for slice-based cell reselection; if there is no frequency that supports the network slice (group) that the user equipment is allowed to access, and it is confirmed that the user equipment is configured with a slice remapping function, determining a remapping slice of the network slice (group) that the user equipment is allowed to access and selecting a frequency that supports the remapping slice as the first candidate frequency for the slice-based cell reselection.

In some embodiments, selecting the frequency that supports a part of network slices (groups) that the user equipment is allowed to access as the first candidate frequency for slice-based cell reselection may include: selecting a frequency that supports a maximum number of network slices (groups) that the user equipment is allowed to access as the first candidate frequency for slice-based cell reselection; or, selecting a frequency that supports a number of network slices (groups) that the user equipment is allowed to access exceeding a first threshold as the first candidate frequency for the slice-based cell reselection; or, determining a slice priority weighted value that supports the network slice (group) that the user equipment is allowed to access according to a network slice priority of each network slice (group) that the user equipment is allowed to access, obtaining a slice priority accumulated weighted value according to the slice priority weighted value, and selecting a frequency with a highest slice priority accumulated weighted value as the first candidate frequency for slice-based cell reselection; or, selecting a frequency with a slice priority accumulated weighted value exceeding a second threshold as the first candidate frequency for slice-based cell reselection.

In some embodiments, deriving the first candidate frequency for slice-based cell reselection according to the network slice information and the slice-based cell reselection information by the user equipment may include: determining a service type of each network slice (group) that the user equipment is allowed to access; determining a service usage degree of the user equipment for each network slice (group) that the user equipment is allowed to access according to a service trigger frequency of the user equipment for each network slice (group) that the user equipment is allowed to access; selecting a frequency that supports a network slice (group) that the user equipment is allowed to access with a service usage degree higher than or equal to a service usage degree threshold as the first candidate frequency for the slice-based cell reselection; or, determining a service access time delay requirement of each network slice (group) that the user equipment is allowed to access according to the service type of each network slice (group) that the user equipment is allowed to access, and selecting a frequency that supports a network slice (group) that the user equipment is allowed to access with a service access time delay requirement lower than or equal to a service access time delay threshold as the first candidate frequency for slice-based cell reselection.

In some embodiments, deriving the first priority frequency for slice-based cell reselection from the plurality of first candidate frequencies for slice-based cell reselection according to the network slice information and the slice-based cell reselection information may include: selecting a first candidate frequency for slice-based cell reselection with a highest slice-based cell reselection frequency priority as the first priority frequency for slice-based cell reselection; if the first priority frequency for slice-based cell reselection derived based on the highest slice-based cell reselection frequency priority is more than one, selecting a first candidate frequency for slice-based cell reselection with a highest cell reselection frequency priority as the first priority frequency for slice-based cell reselection.

In some embodiments, deriving the first priority frequency for slice-based cell reselection from the plurality of first candidate frequencies for slice-based cell reselection according to the network slice information and the slice-based cell reselection information may include: obtaining a network slice priority of each network slice (group) that the user equipment is allowed to access, and determining a slice priority weighted value of the network slice (group) that the user equipment is allowed to access according to the network slice priority; obtaining a weighted slice-based cell reselection frequency priority of each first candidate frequency for slice-based cell reselection according to the slice priority weighted value of each network slice (group) that the user equipment is allowed to access and the slice-based cell reselection frequency priority of each first candidate frequency for slice-based cell reselection; selecting a first candidate frequency for slice-based cell reselection with a highest weighted slice-based cell reselection frequency priority as the first priority frequency for slice-based cell reselection; and if the first priority frequency for slice-based cell reselection derived based on the highest weighted slice-based cell reselection frequency priority is more than one, selecting a first candidate frequency for slice-based cell reselection with a highest cell reselection frequency priority as the first priority frequency for slice-based cell reselection.

In some embodiments, deriving the first priority frequency for slice-based cell reselection from the plurality of first candidate frequencies for slice-based cell reselection according to the network slice information and the slice-based cell reselection information may include: determining a service type of each network slice (group) that the user equipment is allowed to access; determining a service usage degree of the user equipment for each network slice (group) that the user equipment is allowed to access according to a service trigger frequency of the user equipment for each network slice (group) that the user equipment is allowed to access; and selecting a first candidate frequency for slice-based cell reselection with a highest slice-based cell reselection frequency priority in the network slice (group) that the user equipment is allowed to access with a service usage degree higher than or equal to a service usage degree threshold as the first priority frequency for slice-based cell reselection; or, determining a service access time delay requirement of each network slice (group) that the user equipment is allowed to access according to the service type of each network slice (group) that the user equipment is allowed to access, and selecting a first candidate frequency for slice-based cell reselection with a highest slice-based cell reselection frequency priority in the network slice (group) that the user equipment is allowed to access that supports a service access time delay requirement lower than or equal to a service access time delay threshold as the first priority frequency for slice-based cell reselection.

In step S330, the user equipment performs cell reselection on the first priority frequency for slice-based cell reselection, and identifies a suitable cell for camping on the first priority frequency for slice-based cell reselection.

In some embodiments, the method may further include: when the user equipment initiates a service for a first slice, determining to support triggering slice-based cell reselection when the user equipment initiates a service; determining that the user equipment needs to trigger slice-based cell reselection; selecting a frequency that supports the first slice as a second candidate frequency for slice-based cell reselection; selecting a second candidate frequency for slice-based cell reselection with a highest slice-based cell reselection frequency priority of the first slice as a second priority frequency for slice-based cell reselection; if the second priority frequency for slice-based cell reselection derived based on the highest slice-based cell reselection frequency priority of the first slice is more than one, selecting a second candidate frequency for slice-based cell reselection with a highest cell reselection frequency priority as the second priority frequency for slice-based cell reselection; and reselecting from the suitable cell for camping to a first cell on the second priority frequency based on the slice-based cell reselection the user equipment, and initiating random access in the first cell.

In some embodiments, determining to support triggering slice-based cell reselection when the user equipment initiates a service may include: if the user equipment receives a first information element sent by a network device and the first information element indicates to support triggering slice-based cell reselection when the user equipment initiates a service, determining to support triggering slice-based cell reselection when the user equipment initiates a service; or, if the first information element indicates to support triggering slice-based cell reselection when the user equipment initiates a service of a first specific slice, and the first specific slice includes the first slice, determining to support triggering slice-based cell reselection when the user equipment initiates a service.

In some embodiments, the method may further include: if the first information element indicates not to support triggering slice-based cell reselection when the user equipment initiates a service, or if the first information element indicates not to support triggering slice-based cell reselection when the user equipment initiates a service of a specific slice, or if the first information element indicates to support triggering slice-based cell reselection when the user equipment initiates a service of a first specific slice and the first specific slice does not include the first slice, or if the user equipment does not receive the first information element sent by the network device, determining not to support triggering slice-based cell reselection when the user equipment initiates a service; and initiating, by the user equipment, random access to the suitable cell for camping.

In some embodiments, determining that the user equipment needs to trigger slice-based cell reselection may include: if the first priority frequency for slice-based cell reselection does not support the first slice, or if the first priority frequency for slice-based cell reselection supports the first slice and the slice-based cell reselection frequency priority of the first slice corresponding to the first priority frequency for slice-based cell reselection is less than a priority threshold, or if the first priority frequency for slice-based cell reselection supports the first slice and the first priority frequency for slice-based cell reselection is not a priority frequency of the first slice, determining that the user equipment needs to trigger slice-based cell reselection.

In some embodiments, the method may further include: if the first priority frequency for slice-based cell reselection supports the first slice and the slice-based cell reselection frequency priority of the first slice corresponding to the first priority frequency for slice-based cell reselection is greater than the priority threshold, or if the first priority frequency for slice-based cell reselection supports the first slice and the first priority frequency for slice-based cell reselection is the priority frequency of the first slice, determining that the user equipment does not need to trigger slice-based cell reselection, and initiating, by the user equipment, the service of the first slice in the suitable cell for camping.

In some embodiments, the method may further include: if there is no frequency that supports the first slice, remapping the first slice to a second slice; selecting a frequency that supports slice remapping access from the frequency that supports the second slice as a third priority frequency for slice-based cell reselection; and reselecting from the suitable cell for camping to a second cell on the third priority frequency for slice-based cell reselection by the user equipment, and initiating random access in the second cell.

In some embodiments, remapping the first slice to a second slice may include: if the user equipment receives a second information element sent by the network device, and the second information element indicates to support the user equipment to trigger cell reselection and initial access based on slice remapping, determining that the user equipment supports a slice remapping function; or if the second information element indicates to support the user equipment to trigger cell reselection and initial access based on slice remapping for a service of a second specific slice, and the second specific slice includes the first slice, determining that the user equipment supports a slice remapping function; and remapping the first slice to the second slice.

In some embodiments, the method may further include: if the second information element indicates not to support the user equipment to trigger cell reselection or initial access based on slice remapping, or if the second information element indicates not to support the user equipment to trigger cell reselection or initial access based on slice remapping for the service of the second specific slice, or if the second information element indicates to support the user equipment to trigger cell reselection or initial access based on slice remapping for the service of the second specific slice, and the second specific slice does not include the first slice, or if the user equipment does not receive the second information element sent by the network device, determining that the user equipment does not support the slice remapping function; and initiating, by the user equipment, random access to the suitable cell for camping.

In some embodiments, initiating random access in the second cell may include: sending, by the user equipment, an access request to a network device in a process of initiating random access in the second cell, where the access request carries a slice remapping indication, so that the network device selects to accept or reject the access request of the user equipment according to the slice remapping indication.

According to the method for slice-based cell reselection provided by the embodiments of the present disclosure, the user equipment can obtain the network slice information and the slice-based cell reselection information, and can derive the first priority frequency for slice-based cell reselection according to the obtained network slice information and the slice-based cell reselection information, so that the user equipment can perform cell reselection on the derived first priority frequency for slice-based cell reselection, and identify a suitable cell for camping on the first priority frequency for slice-based cell reselection. The problem of selecting the first priority frequency for slice-based cell reselection is solved, which can help UE to reasonably select the first priority frequency for slice-based cell reselection, so as to better realize rapid access based on the slice (group) subsequently.

The method provided according to the embodiments of the present disclosure is illustrated below in conjunction with FIG. 4, however the present disclosure is not limited to this.

The method provided according to the embodiments of the present disclosure may implement slice-based cell reselection and access, may be applied to the field of wireless communication technology and terminal technology, and in particular, relates to 5G evolution and standardization of 5G.

The application scene of the method provided according to the embodiments of the present disclosure may include the following. For rapid access of UE, a cell reselection parameter related to a slice may be indicated to the UE by means of broadcast or radio resource control (RRC) dedicated signaling (such as an RRCRelease message, i.e. an RRC release message), which may include supported slice (group) information and slice (group)-based frequency priority information, so that the UE rapidly accesses a cell supporting its service slice, thereby avoiding time delay caused by triggering operations such as switching or redirection due to the fact that related services are not supported after traditional access. In the aspect of service continuity assurance, introducing a slice remapping mechanism/function is mainly considered. When the radio resource cannot satisfy the service level protocol (SLA) of the service, the service interruption is avoided by means of slice requirement degradation, and some or all of service rejection due to the fact that the base station does not support the slice is reduced in the UE moving process.

The method provided according to the embodiments of the present disclosure can be applied to 5G and a subsequent evolution system of 5G. On one hand, a trigger scene for cell reselection and a selection mechanism for frequency priority are enhanced, where triggering a slice-based cell reselection mechanism when UE initiates a service is added. For a UE cell reselection process, a multi-level and step-by-step screening mechanism is designed, helping the UE to determine a reselection frequency priority and reasonably select a frequency and a cell for camping, thus better realizing slice-based rapid access. On the other hand, for the potential fairness problem of the slice remapping mechanism, a cell reselection and initial access mechanism based on slice remapping is proposed to provide more fair differentiated radio resource and service for the UE or user.

FIG. 4 schematically shows a schematic flowchart of a method for slice-based cell reselection according to another embodiment of the present disclosure.

As shown in FIG. 4, the method provided according to embodiments of the present disclosure may include the following steps.

The method provided according to the embodiments of the present disclosure is applicable to slice-based cell reselection and access, the main solution of which includes two parts.

The first part is for slice-based inter-frequency cell reselection, and the method may include the following steps S401-S404.

In step S401, inter-frequency cell reselection is triggered.

When UE triggers inter-frequency cell reselection, a slice-based inter-frequency cell reselection mechanism includes deriving a high priority frequency according to information such as UE service slice requirement, slice (group)-based frequency priority information, traditional frequency priority information, and a frequency priority selection policy, etc., and further identifying a suitable cell and camping (the suitable cell is referred to as a suitable cell for camping) on the high priority frequency according to a cell reselection criterion.

In step S402, a frequency candidate set preferentially accessed is derived according to the UE service slice requirement.

Step S402 may specifically include step 1; when the UE needs to trigger inter-frequency cell reselection, the UE first derives candidate frequency information/a candidate frequency set preferentially accessed by the UE according to the broadcast message or the slice (group) information supported by the inter-frequency received in the RRC signaling.

In the embodiments of the present disclosure, the policy for deriving the candidate frequency set preferentially accessed by the UE may be configured by the network side or autonomously determined by the UE, which may include, but is not limited to, one or more of the following manners:

(1) A frequency that supports all network slices (groups) that the user equipment is allowed to access is selected as a candidate frequency set.

(2) When there is no frequency that supports all network slices (groups) that the user equipment is allowed to access, a frequency that supports a part of network slices (groups) that the user equipment is allowed to access and satisfies a specific condition is selected as a candidate frequency set.

For example, a frequency that supports a maximum number of network slices (groups) that the user equipment is allowed to access is selected as a candidate frequency set; or, a frequency that supports a number of network slices (groups) that the user equipment is allowed to access exceeding a first threshold is selected as a candidate frequency set; or, a slice priority weighted value of each network slice (group) that the user equipment is allowed to access may be determined according to the network slice priority of each network slice (group) that the user equipment is allowed to access, and a candidate frequency set with a slice priority accumulated weighted value after weighted calculation being higher (e.g. highest) or satisfying a second threshold (for example, the slice priority accumulated weighted value exceeding the second threshold) may be selected.

In the embodiments of the present disclosure, the slice priority weighted value of the slice (group) may be configured by the network side or autonomously set by the UE, for example, may be set according to the network slice priority of each network slice (group) that the user equipment is allowed to access, whether the slice (group) is frequently triggered or has a high time delay requirement, etc., which is not limited in the embodiments of the present disclosure.

In the embodiments of the present disclosure, the first threshold and the second threshold may be set according to actual requirements. The second threshold and the first threshold may be the same or different, which is not limited in the present disclosure.

(3) When there is no frequency that supports the network slice (group) that the user equipment is allowed to access of the UE, if the network side configures the slice (group) remapping function for the UE, the UE may determine a remapping slice (group) according to the slice (group) remapping policy configured by the network side, and then select a frequency that supports the corresponding remapping slice (group) as the candidate frequency set.

The candidate frequency set derived according to (1), (2) and (3) in step 1 may include each first candidate frequency for slice-based cell reselection.

(4) For inter-frequency reselection triggered when the UE initiates a service, a frequency that supports the currently triggered service slice (group) (for example, the first slice) or the remapped new service slice (group) (for example, the second slice) is selected as the candidate frequency set.

The candidate frequency set derived by selecting the frequency that supports the currently triggered service slice (group) may include each second candidate frequency for slice-based cell reselection. The candidate frequency set derived by selecting the frequency that supports the remapped new service slice (group) may include each third candidate frequency for slice-based cell reselection.

In step S403, a high priority frequency is derived according to the slice (group)-based frequency priority information, the frequency priority selection policy, etc.

Step S403 may specifically include step 2; the UE may derive the high priority frequency according to the slice (group)-based frequency priority information received in the broadcast or RRC signaling, the traditional frequency priority information, and the slice-based frequency priority selection policy, etc.

In the embodiments of the present disclosure, the slice-based frequency priority selection policy may be configured by the network side or autonomously determined by the UE, which may include, but is not limited to, one or more of the following manners.

(1) A frequency with the highest slice (group)-based frequency priority information is selected as a high priority frequency.

In the embodiments of the present disclosure, when the UE only desires one service slice (group) (i.e. the number of the network slice (group) that the user equipment is allowed to access is 1), the UE may select the frequency that supports the slice (group) and that has the highest slice-based cell reselection frequency priority as the high priority frequency.

When the UE desires a plurality of service slices (group) (i.e. the number of the network slice (group) that the user equipment is allowed to access is greater than 1), the UE may select the frequency with the highest slice-based cell reselection frequency priority from all frequencies that support the related slices (groups) as the high priority frequency.

(2) A network slice priority of each network slice (group) that the user equipment is allowed to access is obtained, a slice priority weighted value of each network slice (group) that the user equipment is allowed to access is determined according to the network slice priority, a weighted slice-based cell reselection frequency priority is obtained after performing weighted calculation on the slice-based cell reselection frequency priority according to the slice priority weighted value of the supported slice (group), and a frequency with a higher (for example, the highest) value of the weighted slice-based cell reselection frequency priority is selected as the high priority frequency.

The slice priority weighted value of the slice (group) here is the slice priority weighted value in step (2) described above. That is, the slice priority weighted value of the slice (group) may be configured by the network side or autonomously set by the UE, for example, may be set according to the network slice priority of each network slice (group) that the user equipment is allowed to access, whether the slice (group) is frequently triggered or has a high time delay requirement, etc., which is not limited in the embodiments of the present disclosure.

(3) A frequency with the highest slice-based cell reselection frequency priority corresponding to the slice (group) that is frequently triggered or has a high time delay requirement, is selected as the high priority frequency.

The high priority frequency derived according to (1), (2), and (3) in step 2 described above may include the first priority frequency for slice-based cell reselection.

(4) For inter-frequency reselection triggered when the UE initiates a service, the frequency with the highest slice-based cell reselection frequency priority and supporting the currently triggered service slice (group) or the remapped new service slice (group) is selected as the high priority frequency.

Among them, the high priority frequency derived by selecting the frequency with the highest slice-based cell reselection frequency priority and supporting the currently triggered service slice (group) or the remapped new service slice (group) may include the second priority frequency for slice-based cell reselection.

The high priority frequency derived by selecting the frequency with the highest slice-based cell reselection frequency priority and supporting the remapped new service slice (group) may include the third priority frequency for slice-based cell reselection.

(5) If the high priority frequency derived based on the above method is more than one, the frequency with a higher (e.g. highest) traditional frequency priority is selected as the high priority frequency.

In step S404, a suitable cell on the high priority frequency is identified according to a cell reselection criterion, and camping is performed.

Step S404 may specifically include step 3: the UE selects a suitable cell for camping on the high priority frequency according to a cell reselection rule, for example, selects a cell where the signal quality satisfies a requirement for camping.

The second part is for slice-based rapid access, and may include the following steps S405-S407.

In step S405, when the UE triggers a service, it is determined whether to support performing inter-frequency cell reselection once again; if yes, step S406 is performed; and if not, step S407 is performed.

In step S406, it is continued to determine whether to need performing inter-frequency cell reselection once again; if yes, it is turned back to step S401 to trigger the inter-frequency cell reselection; and if not, step S407 is performed.

When the UE triggers a service, the UE firstly determines whether to support and whether to need triggering slice-based cell reselection. If not, the UE directly initiates a random access in a suitable cell for camping; otherwise, the UE triggers inter-frequency cell reselection once, and reselects to a suitable cell on a high priority frequency that supports the currently triggered service slice (group) or the remapped new slice (group), and then initiates random access again. Specifically; the following steps 1 to 5 may be included.

In step 1, when the UE initiates a service, the UE may determine the slice (group) type of the initiated service according to the slice type information indicated by the network attached storage (NAS) layer.

The UE firstly determines whether to support triggering slice-based inter-frequency cell reselection once when the UE initiates a service according to the network side configuration. If it is not supported, random access is initiated directly in a suitable cell for camping; and if it is supported, the following operations may be performed.

In step 2, the UE determines whether to need triggering slice-based cell reselection once according to the cell reselection slice (group) related information received in the broadcast message or the RRC signaling and the policy for triggering cell reselection based on the service.

In the embodiments of the present disclosure, the policy for triggering cell reselection based on the service may be autonomously decided by the network side or the UE, which may include, but is not limited to, one or more of the following manners.

(1) The first priority frequency for slice-based cell reselection supports an initiated service slice (group) (for example, supporting the first slice), but is not a preferred access frequency for the service slice (group).

In the embodiments of the present disclosure, the policy for determining the preferred access frequency may be configured by the network side or autonomously determined the UE, which may include, but is not limited to the following manners:

If the first priority frequency for slice-based cell reselection is the high priority frequency for the initiated service slice (group), it is determined that the first priority frequency for slice-based cell reselection is the preferred access frequency for the service slice (group); otherwise, it is determined that the first priority frequency for slice-based cell reselection is not the preferred access frequency for the service slice (group).

Alternatively, if the slice-based cell reselection frequency priority for the initiated service slice (group) of the first priority frequency for slice-based cell reselection is greater than a threshold (i.e., the priority threshold, which may be set according to actual requirements, and not limited in the present disclosure), it is determined that the first priority frequency for slice-based cell reselection is the preferred access frequency for the service slice (group); otherwise, it is determined that the first priority frequency for slice-based cell reselection is not the preferred access frequency for the service slice (group).

(2) The first priority frequency for slice-based cell reselection does not support the initiated service slice (group).

In step 3, when the UE does not need to trigger slice-based cell reselection, the UE directly initiates random access on the first priority frequency for slice-based cell reselection; and if the UE needs to trigger the slice-based cell reselection, the UE triggers slice (group)-based inter-frequency cell reselection once, and reselects to a suitable cell (such as the first cell) on the high-priority frequency that supports the currently triggered service slice (group).

In step 4, if the frequency that supports the currently triggered service slice (group) cannot be found in the process of inter-frequency reselection, the UE determines whether to support triggering slice remapping mechanism according to indication of the network side.

If it is supported, the currently triggered service slice (group) may be remapped to the supported new service slice (group) according to the slice (group) remapping policy configured by the network side, thus reselecting to a suitable cell on the high priority frequency that supports the new service slice (group), such as the second cell.

In step 5, random access is initiated in the suitable cell on the high priority frequency.

The functions and parameter configurations mentioned in the embodiments of the present disclosure are described below:

1. Function configuration for triggering slice-based cell reselection when the UE initiates a service.

The function for triggering slice-based cell reselection when the UE initiates a service is an optional function, and may be configured by the network side through a system message or an RRC dedicated signaling.

(1) The network side configures a first information element through the system message or the RRC dedicated signaling, and the network side configures the first information element to indicate whether to support triggering the slice-based cell reselection when the UE initiates a service.

(2) The first information element may be a UE-level configuration, i.e. indicating whether to support triggering the slice (group)-based cell reselection when the UE initiates a service; or, the first information element may be a slice (group)-level configuration, i.e. indicating whether to support triggering the slice-based cell reselection when the UE initiates a specific service slice (group) (for example, a first specific slice).

(3) If the network side does not indicate the first information element, it is not supported by default.

2. Function configuration for cell reselection and initial access based on slice remapping.

The function for cell reselection and initial access based on slice remapping of the UE is an optional function, and may be configured by the network side through a system message or an RRC dedicated signaling.

(1) The network side configures the second information element to indicate whether to support the cell reselection or initial access based on slice remapping of the UE.

(2) The second information element may be a UE-level configuration, i.e. indicating whether to support the UE to trigger cell reselection or initial access based on slice remapping; or, the second information element may be a slice (group)-level configuration, i.e. indicating whether to support the UE to trigger cell reselection or initial access based on slice remapping for a specific service slice (group).

(3) If the network side does not indicate the second information element, it is not supported by default.

3. Access control of the network side on the cell reselection and initial access based on slice remapping of the UE may include, but is not limited to, the following manners.

(1) Manner 1. The network side indicates whether to support cell reselection and initial access based on slice remapping of the UE, and the UE determines according to the indication. The network side may broadcast, in the system message, whether the current frequency supports cell reselection or access based on slice remapping of the UE. If it is not indicated, it is not supported by default. When the UE triggers cell reselection or initial access based on slice remapping, if the selected high priority frequency does not support reselection or initial access based on slice remapping, the frequency cannot be selected.

(2) Manner 2. For an initial access scene, the UE may indicate the UE that slice remapping is performed in the random access process (such as in the msg3 of random access in step 4 or msgA of random access in step 2). After receiving the indication, the network side may select to accept or reject the access request of the UE.

In the following, with regard to cell reselection and initial access scenes provided in the above embodiments, some specific examples are provided for illustration, but the present disclosure is not limited to this.

(1) Selection of a frequency for camping (high priority frequency) when the UE supports a plurality of service slices.

Example 1.1. The UE may find a candidate frequency set that supports services of all network slices (groups) that the user equipment is allowed to access.

It is assumed that the service slice desired by the UE is slice 1 and slice 2, and the slice-based cell reselection frequency priority and the traditional frequency priority are shown in Table 1.

TABLE 1

Cell Reselection Frequency Priority Configuration

| Frequency | Priority of Slice 1 | Priority of Slice 2 | Traditional priority |
|---|---|---|---|
| f1 | 6 | 3 | 4 |
| f2 | 6 | 5 | 3 |
| f3 | 5 | 4 | 5 |
| f4 | — | 4 | 5 |

In the above Table 1, the priority of the slice 1 is the priority of the slice-based cell reselection frequency priority of the slice 1 at each frequency, the priority of the slice 2 is the slice-based cell reselection frequency priority of the slice 2 at each frequency, and the traditional priority is the cell reselection frequency priority corresponding to each frequency.

(1) The UE firstly derives a candidate frequency set, and selects frequencies f1, f2, and f3 that support all desired service slices of the UE as a candidate frequency set.

(2) The high priority frequency may be derived in any one of the following manners:

Manner 1. The frequency with the highest slice-based frequency priority is selected. The priority value of f1 and f2 for the slice 1 is 6, which is the highest value in the table, so it is derived that f1 and f2 are high priority frequencies. Furthermore, according to the cell reselection frequency priority (i.e. the traditional priority value), the value of f1 is 4, which is higher than 3 corresponding to f2. Therefore, f1 is finally derived as the high priority frequency.

Manner 2. Weighted computation is performed for selection. It is assumed that, based on network side configuration or UE autonomous decision, the slice priority weighted value of the slice 1 is 0.7 and the slice priority weighted value of the slice 2 is 0.3. After the weighted calculation, the weighted slice-based cell reselection frequency priority corresponding to the f1 is 6*0.7+3*0.3=5.1; the weighted slice-based cell reselection frequency priority corresponding to f2 is 6*0.7+5*0.3=5.7; and the weighted slice-based cell reselection frequency priority corresponding to f3 is 5*0.7+4*0.3=4.7. Therefore, f2 is finally derived as the high priority frequency.

Manner 3. It is assumed that the slice 1 is an ultra reliable low latency communication (URLLC) service, which is not a common service of the UE, and the slice 2 is an enhanced mobile broadband (eMBB) service, which is a common service of the UE.

In the embodiments of the present disclosure, if according to the time delay requirement, the high priority frequencies f1 and f2 corresponding to the slice 1 (URLLC service) are selected; and f1 is further derived as the final high priority frequency according to that the cell reselection frequency priority 4 of f1 is greater than the cell reselection frequency priority 3 of f2.

If according to whether it is triggered frequently, the high priority frequency f2 corresponding to the slice 2 (eMBB service) is selected as the final high priority frequency.

Example 1.2: The UE only finds a candidate frequency set that supports a part of its desired service slices.

Assuming that the desired service slices of the UE are slice 1, slice 2 and slice 3, the slice-based cell reselection frequency priority and the traditional frequency priority are shown in Table 2.

TABLE 2

| Cell reselection frequency priority configuration | | | | |
|---|---|---|---|---|
| Frequency | Priority of Slice 1 | Priority of Slice 2 | Priority of Slice 3 | Traditional Priority |
| f1 | 6 | 3 | — | 4 |
| f2 | 6 | — | 5 | 3 |
| f3 | 5 | 4 | — | 5 |
| f4 | — | 4 | — | 5 |

(1) The UE firstly derives a candidate frequency set, and selects the frequency that satisfies a specific condition and supports a part of the network slices (groups) that the user equipment is allowed to access as a candidate frequency set according to a selection policy for the candidate frequency set configured by the network side or autonomously decided by the UE.

Manner 1. The frequency that supports the maximum number of slices is selected. Then, f1, f2, and f3 (all supporting two slices) are selected as the candidate frequency set.

Manner 2. Assuming that the first threshold for selection of the number of the slices being supported is 1, f1, f2, f3, and f4 is selected as the candidate frequency set.

Manner 3. Assuming that the slice priority weighted value of the slice 1 is 0.6, the slice priority weighted value of the slice 2 is 0.3, the slice priority weighted value of the slice 3 is 0.1, after weighted calculation, the slice priority accumulated weighted value of f1 is 0.6+0.3=0.9, the slice priority accumulated weighted value of f2 is 0.6+0.1=0.7, the slice priority accumulated weighted value of f3 is 0.6+0.3=0.9, and finally f1 and f3 are selected as the frequency candidate set according to the size of the slice priority accumulated weighted value.

Manner 4. It is assumed that slice 1 is URLLC service 1, which is relatively common; slice 2 is URLLC service 2, which is not common; and slice 3 is an eMBB service, which is common. The frequencies f1 and f3 supporting the slice 1 and the slice 2 may be selected as the candidate frequency set according to the time delay requirement; and the frequency f2 supporting the slice 1 and the slice 3 may be selected as the candidate frequency set according to whether it is common.

(2) A high priority frequency is derived.

Similar to Example 1, details are not described again.

Example 1.3. The UE does not find the candidate frequency that supports the desired service slice, and maps to a new service slice according to the slice remapping policy configured by the network side.

Assuming that the desired service slice of the UE is slice 3, as shown in Table 3, the UE cannot find the candidate frequency that supports the slice 3 in the current region.

TABLE 3

| Cell reselection frequency priority configuration | | | | |
|---|---|---|---|---|
| Frequency | Priority of Slice 1 | Priority of Slice 2 | Priority of Slice 3 | Traditional Priority |
| f1 | 6 | 3 | — | 4 |
| f2 | 6 | — | — | 3 |
| f3 | 5 | 4 | — | 5 |
| f4 | — | 4 | — | 4 |

If the slice remapping function is configured by the network side at this time, the slice 3 may be mapped to the slice 2 based on the slice remapping policy, then the UE selects f1, f2, and f3 supporting the slice 2 as the candidate frequency set, and further derives f3 as the high priority frequency according to the slice-based cell reselection frequency priority and the traditional frequency priority.

(2) Slice-based rapid access when the UE initiates a service.

Assuming that the desired service slices of the UE are slice 1, slice 2, slice 3 and slice 4, the first priority frequency for slice-based cell reselection is f1, and the cell reselection frequency priority configuration is shown in Table 4.

TABLE 4

| Cell reselection frequency priority configuration | | | | |
|---|---|---|---|---|
| Frequency | Priority of Slice 1 | Priority of Slice 2 | Priority of Slice 3 | Priority of Slice 4 |
| f1 | 6 | 3 | — | — |
| f2 | 6 | — | 5 | — |
| f3 | 5 | 4 (supporting slice remapping access) | — | — |
| f4 | — | 5 | 3 | — |

Example 2.1. The first priority frequency for slice-based cell reselection is the preferred access frequency of the service slice initiated by the UE.

It is assumed that the preferred access frequency determination policy of the UE is based on that the value of the slice-based frequency priority is not less than 3. When the UE initiates the service of the slice 2, if the value of the frequency priority of f1 for slice 2 is 3, f1 satisfies the preferred access frequency requirement, and the UE may directly initiate the service of the slice 2 in the suitable cell for camping, without triggering cell reselection.

Example 2.2. The first priority frequency for slice-based cell reselection is not the preferred access frequency of the service slice initiated by the UE.

It is assumed that the preferred access frequency determination policy for the UE is that the first priority frequency for slice-based cell reselection is the high priority frequency of the initiated service slice (group). When the UE initiates the service of slice 2, if the first priority frequency for slice-based cell reselection f1 does not satisfy the preferred access frequency requirement, the UE needs to trigger cell reselection once, and reselects to the high priority frequency f4 that supports the slice 2, and initiates access.

Example 2.3. The first priority frequency for slice-based cell reselection does not support the service slice initiated by the UE.

When the UE initiates the service of slice 3, the first priority frequency for slice-based cell reselection f1 does not support this service slice, and the UE needs to trigger cell reselection once, reselects to the high priority frequency f2 supporting the slice 3, and initiates access.

Example 2.4. The UE does not find the frequency that supports the initiated service slice, and triggers cell reselection and initial access based on slice remapping.

When the UE initiates the service of slice 4, the first priority frequency for slice-based cell reselection f1 does not support this service slice, and the UE triggers cell reselection once. During reselection, the UE does not find the frequency that supports slice 4. If the UE is configured with the slice remapping function, the slice 4 is remapped to slice 2 according to the slice remapping policy. The UE performs cell reselection for slice 2, selects the frequency f3 that supports the slice remapping access, and initiates access.

According to the method for slice-based cell reselection provided in the embodiments of the present disclosure, by determining a network slice (group) that the user equipment is allowed to access, a first candidate frequency that supports the network slice (group) that the user equipment is allowed to access is obtained, and a slice-based cell reselection frequency priority and a cell reselection frequency priority of each first candidate frequency is obtained; then the UE is helped to derive a first priority frequency for slice-based cell reselection based on the slice-based cell reselection frequency priority of each first candidate frequency (i.e. based on the slice (group) frequency priority information) and further in combination with the traditional cell reselection frequency priority of each first candidate frequency; furthermore, the first priority frequency for slice-based cell reselection is taken as a first priority frequency for slice-based cell reselection of the user equipment, and a suitable cell is selected on the first priority frequency for slice-based cell reselection as a suitable cell for camping, so that the user equipment camps in the suitable cell for camping, thus solving the problem of selecting the slice-based cell reselection frequency priority. Especially when the UE supports a plurality of slice services, the UE can be helped to reasonably select the first priority frequency for slice-based cell reselection, so that slice (group)-based rapid access can be better realized subsequently.

According to the method provided in the embodiments of the present disclosure, a method for slice-based cell reselection and access may be provided, oriented to 5G and subsequent evolution system for a cell reselection process of UE and especially for a scene when UE supports a plurality of service slices; a priority access candidate frequency set selection policy and a frequency priority selection policy are designed for slice-based frequency priority selection of a radio access network slice enhancement scene through multi-level and step-by-step screening; and, the frequency priority selection policy is further refined, thus helping the UE to select to camp on a high priority frequency and cell more reasonably, and better realizing slice-based rapid access, solving the problem of additional time delay caused by triggering the UE to reselect and access to another cell through switch or redirection when the UE accesses a cell that does not support the current slice serve in the related art. A policy for triggering cell reselection based on a service is also designed; when the UE initiates a service, the UE is helped to determine whether to trigger cell reselection, so as to help the UE to select a suitable frequency for access. In addition, for the fairness problem of slice remapping, on this basis, the embodiments of the present disclosure further provide a method/mechanism for cell reselection and initial access based on slice remapping, ensuring the fairness of services of the same type of different users, and providing more fair differentiated radio resource and service for the user.

For the method provided in the embodiments of the present disclosure includes, the possible application scenes include, but are not limited to, the following scenes.

1. Oriented to 5G and future evolution system, the limitation problem of 5G network slice technology on the wireless side is to be solved, and the goal of providing differentiated and highly reliable service quality assurance for users is to be achieved.

2. 3GPP starts to pay attention to the enhancement of the radio access network slice technology from the R17 stage, mainly to solve the problems of rapid access of the UE and service continuity assurance. As the discussion continues to go deep, more enhancement directions and application scenes will be identified in the future.

3. A method for slice-based cell reselection and initial access is proposed, potential problems are further mined in combination with the current discussion direction, and solutions are designed to provide a solution reserve for subsequent evolution of the radio access network slice technology.

Figure 5:
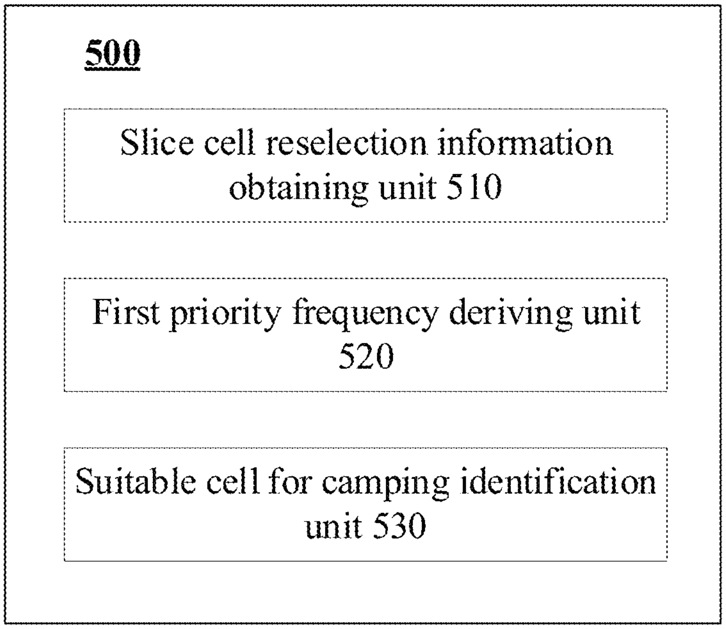
FIG. 5 schematically shows a block diagram of user equipment according to an embodiment of the present disclosure.

FIG. 5 schematically shows a block diagram of user equipment according to an embodiment of the present disclosure. As shown in FIG. 5, the user equipment 500 provided in the embodiments of the present disclosure may include: a slice-based cell reselection information obtaining unit 510, a first priority frequency deriving unit 520, and a suitable cell for camping identification unit 530.

Among them, the slice-based cell reselection information obtaining unit 510 may be configured to obtain network slice information and slice-based cell reselection information. The first priority frequency deriving unit 520 may be configured to derive a first priority frequency for slice-based cell reselection according to the network slice information and the slice-based cell reselection information. The suitable cell for camping identification unit 530) may be configured to perform cell reselection on the first priority frequency for slice-based cell reselection, and identify a suitable cell for camping on the first priority frequency for slice-based cell reselection.

In some embodiments, the first priority frequency deriving unit 520 may include: a cell reselection first candidate frequency deriving unit, which may be configured to derive a first candidate frequency for slice-based cell reselection according to the network slice information and the slice-based cell reselection information; a cell reselection first priority frequency selection unit, which may be configured to select the first candidate frequency for slice-based cell reselection as the first priority frequency for slice-based cell reselection if the first candidate frequency for slice-based cell reselection derived by the user equipment is a single frequency; a cell reselection first priority frequency deriving unit, which may be configured to derive the first priority frequency for slice-based cell reselection from a plurality of first candidate frequencies for slice-based cell reselection according to the network slice information and the slice-based cell reselection information if the first candidate frequency for slice-based cell reselection derived by the user equipment is a plurality of frequencies.

In some embodiments, the network slice information may include an identifier of a network slice that the user equipment is allowed to access and a corresponding network slice priority; the slice-based cell reselection information may include an identifier of a network slice or a slice group supported on different frequencies and a corresponding slice-based cell reselection frequency priority; and the network slice corresponding to the identifier of the network slice that the user equipment is allowed to access is a network slice (group) that the user equipment is allowed to access.

In some embodiments, the cell reselection first candidate frequency deriving unit may include: a first candidate frequency deriving subunit, which may be configured to take a frequency that supports all network slices (groups) that the user equipment is allowed to access as the first candidate frequency for the slice-based cell reselection if there is a frequency that supports all network slices (groups) that the user equipment is allowed to access; a second candidate frequency deriving subunit, which may be configured to select a frequency that supports a part of network slices (groups) that the user equipment is allowed to access as the first candidate frequency for slice-based cell reselection if there is no frequency that supports all network slices (groups) that the user equipment is allowed to access; a third candidate frequency deriving subunit, which may be configured to derive a remapping slice of the network slice (group) that the user equipment is allowed to access if there is no frequency that supports the network slice (group) that the user equipment is allowed to access and it is confirmed that the user equipment is configured with a slice remapping function, and select a frequency that supports the remapping slice as the first candidate frequency for the slice-based cell reselection.

In some embodiments, the second candidate frequency deriving subunit may be configured to: select a frequency that supports a maximum number of network slices (groups) that the user equipment is allowed to access as the first candidate frequency for the slice-based cell reselection; or, select a frequency that supports a number of network slices (groups) that the user equipment is allowed to access exceeding a first threshold as the first candidate frequency for the slice-based cell reselection; or, determine a slice priority weighted value that supports the network slice (group) that the user equipment is allowed to access according to a network slice priority of each network slice (group) that the user equipment is allowed to access, obtain a slice priority accumulated weighted value according to the slice priority weighted value, and select a frequency with a highest slice priority accumulated weighted value as the first candidate frequency for slice-based cell reselection; or, select a frequency with a slice priority accumulated weighted value exceeding a second threshold as the first candidate frequency for slice-based cell reselection.

In some embodiments, the cell reselection first candidate frequency deriving unit may be configured to: determine a service type of each network slice (group) that the user equipment is allowed to access; determine a service usage degree of the user equipment for each network slice (group) that the user equipment is allowed to access according to a service trigger frequency of the user equipment for each network slice (group) that the user equipment is allowed to access; select a frequency that supports a network slice (group) that the user equipment is allowed to access with a service usage degree higher than or equal to a service usage level threshold as the first candidate frequency for the slice-based cell reselection; or determine a service access time delay requirement of each network slice (group) that the user equipment is allowed to access according to the service type of each network slice (group) that the user equipment is allowed to access, and select a frequency that supports a network slice (group) that the user equipment is allowed to access with a service access time delay requirement lower than or equal to a service access time delay threshold as the first candidate frequency for slice-based cell reselection.

In some embodiments, the cell reselection first priority frequency deriving unit may be configured to: select a first candidate frequency for slice-based cell reselection with a highest slice-based cell reselection frequency priority as the first priority frequency for slice-based cell reselection; if the first priority frequency for slice-based cell reselection derived based on the highest slice-based cell reselection frequency priority is more than one, select a first candidate frequency for slice-based cell reselection with a highest cell reselection frequency priority as the first priority frequency for slice-based cell reselection.

In some embodiments, the cell reselection first priority frequency deriving unit may be configured to: determine a slice priority weighted value of each network slice (group) that the user equipment is allowed to access by obtaining a network slice priority of each network slice (group) that the user equipment is allowed to access; obtain a weighted slice-based cell reselection frequency priority of each first candidate frequency for slice-based cell reselection according to the slice priority weighted value of each network slice (group) that the user equipment is allowed to access and the slice-based cell reselection frequency priority of each first candidate frequency for slice-based cell reselection; select a first candidate frequency for slice-based cell reselection with a highest weighted slice-based cell reselection frequency priority as the first priority frequency for slice-based cell reselection; if the first priority frequency for slice-based cell reselection derived based on the highest weighted slice-based cell reselection frequency priority is more than one, select a first candidate frequency for slice-based cell reselection with a highest cell reselection frequency priority as the first priority frequency for slice-based cell reselection.

In some embodiments, the cell reselection first priority frequency deriving unit may be configured to: determine a service type of each network slice (group) that the user equipment is allowed to access; determine a service usage degree of the user equipment for each network slice (group) that the user equipment is allowed to access according to a service trigger frequency of the user equipment for each network slice (group) that the user equipment is allowed to access; select a first candidate frequency for slice-based cell reselection with a highest slice-based cell reselection frequency priority in the network slice (group) that the user equipment is allowed to access with a service usage degree higher than or equal to a service usage degree threshold as the first priority frequency for slice-based cell reselection; or determine a service access time delay requirement of each network slice (group) that the user equipment is allowed to access according to the service type of each network slice (group) that the user equipment is allowed to access, and select a first candidate frequency for slice-based cell reselection with a highest slice-based cell reselection frequency priority in the network slice (group) that the user equipment is allowed to access that supports a service access time delay requirement lower than or equal to a service access time delay threshold as the first priority frequency for slice-based cell reselection.

In some embodiments, the user equipment 500 may further include: a supporting cell reselection determination unit, which may be configured to, when the user equipment initiates a service for a first slice, determine to support triggering slice-based cell reselection when the user equipment initiates a service; a needing cell reselection determination unit, which may be configured to determine that the user equipment needs to trigger slice-based cell reselection; a second candidate frequency selection unit, which may be configured to select a frequency that supports the first slice as a second candidate frequency for slice-based cell reselection; a second priority frequency selection unit, which may be configured to select a second candidate frequency for slice-based cell reselection with a highest slice-based cell reselection frequency priority of the first slice as a second priority frequency for slice-based cell reselection; a second priority frequency screening unit, which may be configured to select, if the second priority frequency for slice-based cell reselection derived based on the highest slice-based cell reselection frequency priority of the first slice is more than one, a second candidate frequency for slice-based cell reselection with a highest cell reselection frequency priority as the second priority frequency for slice-based cell reselection; and a first cell reselection unit, which may be configured for the user equipment to reselect from the suitable cell for camping to a first cell on the second priority frequency for slice-based cell reselection, and initiate random access in the first cell.

In some embodiments, the supporting cell reselection determination unit may be configured to: if the user equipment receives a first information element sent by a network device and the first information element indicates to support triggering slice-based cell reselection when the user equipment initiates a service, determine to support triggering slice-based cell reselection when the user equipment initiates a service; or, if the first information element indicates to support triggering slice-based cell reselection when the user equipment initiates a service of a first specific slice and the first specific slice includes the first slice, determine to support triggering slice-based cell reselection when the user equipment initiates a service.

In some embodiments, the user equipment 500 may further include a non-supporting cell reselection determination unit and a suitable cell for camping access unit. The non-supporting cell reselection determination unit may be configured to, if the first information element indicates not to support triggering slice-based cell reselection when the user equipment initiates a service, or if the first information element indicates not to support triggering slice-based cell reselection when the user equipment initiates a service of a specific slice, or if the first information element indicates to support triggering slice-based cell reselection when the user equipment initiates a service of a first specific slice and the first specific slice does not include the first slice, or if the user equipment does not receive the first information element sent by the network device, determine not to support triggering slice-based cell reselection when the user equipment initiates a service. The suitable cell for camping access unit may be configured to enable the user equipment to initiate random access to the suitable cell for camping when it is determined not supported triggering slice-based cell reselection when the user equipment initiates a service.

In some embodiments, the needing cell reselection determination unit may be configured to, if the first priority frequency for slice-based cell reselection does not support the first slice, or if the first priority frequency for slice-based cell reselection supports the first slice and the slice-based cell reselection frequency priority of the first slice corresponding to the first priority frequency for slice-based cell reselection is less than a priority threshold, or if the first priority frequency for slice-based cell reselection supports the first slice and the first priority frequency for slice-based cell reselection is not the priority frequency of the first slice, determine that the user equipment needs to trigger slice-based cell reselection.

In some embodiments, the user equipment 500 may further include a non-needing cell reselection determination unit and a first priority frequency access unit. Among them, the non-needing cell reselection determination unit may be configured to, if the first priority frequency for slice-based cell reselection supports the first slice and the slice-based cell reselection frequency priority of the first slice corresponding to the first priority frequency for slice-based cell reselection is greater than the priority threshold, or if the first priority frequency for slice-based cell reselection supports the first slice and the first priority frequency for slice-based cell reselection is the priority frequency of the first slice, determine that the user equipment does not need to trigger slice-based cell reselection. The first priority frequency access unit may be configured to enable the user equipment to initiate the service of the first slice in the suitable cell for camping when it is determined that the user equipment does not need to trigger slice-based cell reselection.

In some embodiments, the user equipment 500 may further include: a second slice remapping unit, which may be configured to remap the first slice to a second slice if there is no frequency that supports the first slice; a third priority frequency selection unit, which may be configured to select a frequency that supports slice remapping access from a frequency that supports the second slice as a third priority frequency for slice-based cell reselection; and a second cell access unit, which may be configured for the user equipment to reselect from the suitable cell for camping to the second cell on the third priority frequency for slice-based cell reselection, and initiate random access in the second cell.

In some embodiments, the second slice remapping unit may be configured to: if the user equipment receives a second information element sent by the network device and the second information element indicates to support the user equipment to trigger cell reselection and initial access based on slice remapping, determine that the user equipment supports the slice remapping function; or, if the second information element indicates to support the user equipment to trigger cell reselection and initial access based on slice remapping for a service of a second specific slice, and the second specific slice includes the first slice, determine that the user equipment supports a slice remapping function; and, remap the first slice to the second slice.

In some embodiments, the user equipment 500 may further include a non-supporting slice remapping determination unit and a current random access unit. Among them, the non-supporting slice remapping determination unit may be configured to: if the second information element indicates not to support the user equipment to trigger cell reselection or initial access based on slice remapping, or if the second information element indicates not to support the user equipment to trigger cell reselection or initial access based on slice remapping for the service of the second specific slice, or if the second information element indicates to support the user equipment to trigger cell reselection or initial access based on slice remapping for the service of the second specific slice and the second specific slice does not include the first slice, or if the user equipment does not receive the second information element sent by the network device, determine that the user equipment does not support the slice remapping function. The current random access unit may be configured to enable the user equipment to initiate random access to the suitable cell for camping if it is determined that the user equipment does not support the slice remapping function.

In some embodiments, the second cell access unit may be configured to send an access request to the network device in a process of initiating random access in the second cell by the user equipment, where the access request carries a slice remapping indication, so that the network device selects to accept or reject the access request of the user equipment according to the slice remapping indication.

The specific implementation of each unit in the user equipment provided in the embodiments of the present disclosure may refer to the content in the method for slice-based cell reselection described above, and details are not described here again.

Figure 6:
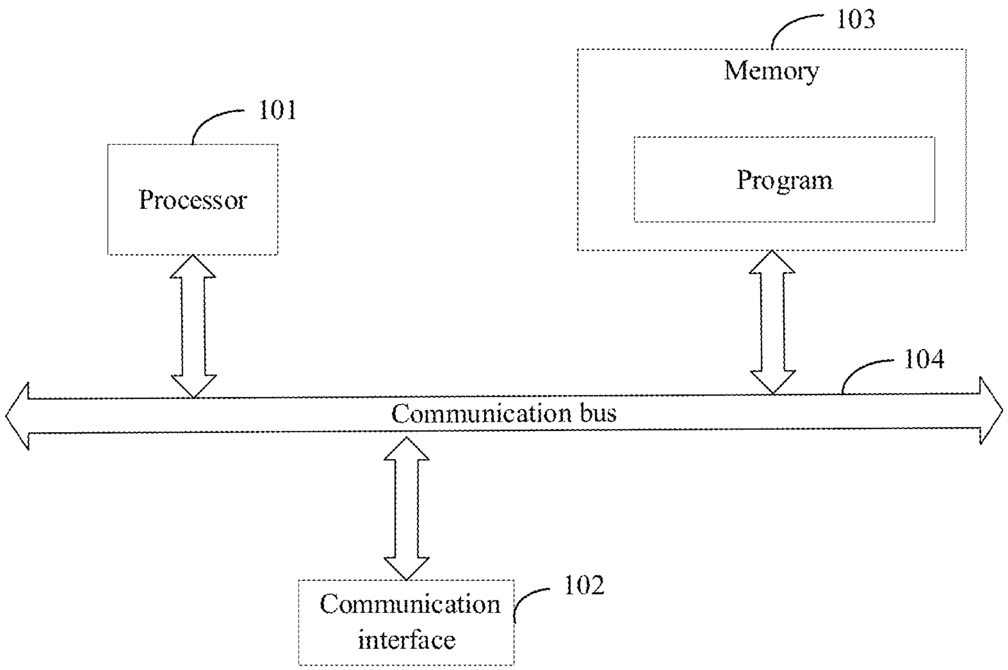
FIG. 6 schematically shows a block diagram of an electronic device according to an embodiment of the present disclosure.

Referring to FIG. 6 below; it shows a schematic structural diagram of an electronic device suitable for implementing embodiments of the present disclosure. The electronic device shown in FIG. 6 is merely an example, and should not bring any limitation to the functions and usage ranges of the embodiments of the present disclosure. The electronic device in FIG. 6 may be, for example, user equipment and/or a network device, but the present disclosure is not limited to this.

Referring to FIG. 6, an electronic device provided according to embodiments of the present disclosure may include a processor 101, a communication interface 102, a memory 103, and a communication bus 104.

Among them, the processor 101, the communication interface 102, and the memory 103 communicate with each other through the communication bus 104.

In some embodiments, the communications interface 102 may be an interface of a communication module, such as an interface of a global system for mobile communications (GSM) module. The processor 101 is configured to execute a program. The memory 103 is configured to store the program. The program may include a computer program, and the computer program includes a computer operation instruction.

The processor 101 may be a central processing unit (CPU), or an application specific integrated circuit (ASIC), or one or more integrated circuits configured to implement the embodiments of the present disclosure.

The memory 103 may include a high-speed random access memory (RAM), or may further include a non-volatile memory, such as at least one magnetic disk memory.

Among them, the program may be specifically configured to: determine a network slice (group) that the user equipment is allowed to access; obtain a first candidate frequency that supports the network slice (group) that the user equipment is allowed to access; obtain a slice-based cell reselection frequency priority and a cell reselection frequency priority of each first candidate frequency; derive a first priority frequency for slice-based cell reselection according to the slice-based cell reselection frequency priority and the cell reselection frequency priority of each first candidate frequency; and, take the first priority frequency for slice-based cell reselection as a first priority frequency for slice-based cell reselection of the user equipment, and identify a suitable cell for camping of the user equipment on the first priority frequency for slice-based cell reselection.

It should be noted that although several units of a device for action execution are mentioned in the above detailed description, such partitioning is not mandatory. In fact, according to embodiments of the present disclosure, the features and functions of two or more units described above may be embodied in one unit. On the contrary, the features and functions of one unit described above may be further divided into a plurality of units to be embodied.

Through the description of the above embodiments, those skilled in the art would easily understand that the example embodiments described herein may be implemented by software, or may be implemented by software in combination with necessary hardware. Therefore, the technical solution according to the embodiments of the present disclosure may be embodied in the form of a software product. The software product may be stored in a non-volatile storage medium (which may be a CD-ROM, a USB flash disk, a mobile hard disk, etc.) or on a network. The software product may include several instructions to enable a computing device (which may be a personal computer, a server, a touch terminal, or a network device, etc.) to perform the method according to the embodiments of the present disclosure.

Other embodiments of the present disclosure will be apparent to those skilled in the art from consideration of the specification and practice of the present disclosure here. The present disclosure is intended to cover any variations, uses, or adaptations of the present disclosure following the general principles of the present disclosure and including common general knowledge or conventional technical means in the art not disclosed in the present disclosure. The specification and embodiments may be considered as examples only, with a true scope and spirit of the present disclosure being indicated by the following claims.

It should be understood that the present disclosure is not limited to the precise construction that has been described above and illustrated in the accompanying drawings, and that various modifications and changes may be made without departing from the scope of the present disclosure. The scope of the present disclosure is limited only by the appended claims.

What is claimed is:

1. A method for slice-based cell reselection, performed by user equipment, and comprising:

obtaining network slice information and slice-based cell reselection information;

deriving a first priority frequency for slice-based cell reselection according to the network slice information and the slice-based cell reselection information; and performing cell reselection on the first priority frequency for slice-based cell reselection, and identifying a suitable cell for camping on the first priority frequency for slice-based cell reselection;

wherein deriving the first priority frequency for slice-based cell reselection according to the network slice information and the slice-based cell reselection information, comprises;

deriving a first candidate frequency for slice-based cell reselection according to the network slice information and the slice-based cell reselection information:

selecting, if the first candidate frequency for slice-based cell reselection derived by the user equipment comprises a single frequency, the first candidate frequency for slice-based cell reselection as the first priority frequency for slice-based cell reselection; and deriving if the first candidate frequency for slice-based cell reselection derived by the user equipment comprises a plurality of first candidate frequencies, the first priority frequency for slice-based cell reselection from the plurality of first candidate frequencies for slice-based cell reselection according to the network slice information and the slice-based cell reselection information.

2. The method according to claim 1, wherein the network slice information comprises an identifier of a network slice or a slice group that the user equipment is allowed to access and a corresponding network slice priority; the slice-based cell reselection information comprises an identifier of a network slice or a slice group supported on a corresponding frequency and a corresponding slice-based cell reselection frequency priority.

3. The method according to claim 2, wherein deriving the first candidate frequency for slice-based cell reselection according to the network slice information and the slice-based cell reselection information, comprises at least one of:

taking, if there is a frequency that supports all network slices that the user equipment is allowed to access, the frequency that supports all network slices that the user equipment is allowed to access as the first candidate frequency for slice-based cell reselection;

selecting, if there is no frequency that supports all network slices that the user equipment is allowed to access, a frequency that supports a part of network slices that the user equipment is allowed to access as the first candidate frequency for slice-based cell reselection; or determining, if there is no frequency that supports a network slice that the user equipment is allowed to access and the user equipment is configured with a slice remapping function, a remapping slice of the network slice that the user equipment is allowed to access, and selecting a frequency that supports the remapping slice as the first candidate frequency for the slice-based cell reselection.

4. The method according to claim 3, wherein selecting the frequency that supports a part of network slices that the user equipment is allowed to access as the first candidate frequency for slice-based cell reselection comprises at least one of:

selecting a frequency that supports a maximum number of network slices that the user equipment is allowed to access as the first candidate frequency for slice-based cell reselection;

selecting a frequency that supports a number of network slices that the user equipment is allowed to access exceeding a first threshold as the first candidate frequency for the slice-based cell reselection;

determining a slice priority weighted value that supports the network slice that the user equipment is allowed to access according to a network slice priority of each network slice that the user equipment is allowed to access, obtaining a slice priority accumulated weighted value according to the slice priority weighted value, and selecting a frequency with a highest slice priority accumulated weighted value as the first candidate frequency for slice-based cell reselection; or selecting a frequency with a slice priority accumulated weighted value exceeding a second threshold as the first candidate frequency for slice-based cell reselection.

5. The method according to claim 2, wherein deriving the first candidate frequency for slice-based cell reselection according to the network slice information and the slice-based cell reselection information, comprises at least one of:

determining a service type of each network slice that the user equipment is allowed to access, determining a service usage degree of the user equipment for each network slice that the user equipment is allowed to access according to a service trigger frequency of the user equipment for each network slice that the user equipment is allowed to access, and selecting a frequency that supports a network slice that the user equipment is allowed to access with a service usage degree higher than or equal to a service usage degree threshold as the first candidate frequency for the slice-based cell reselection; or determining a service type of each network slice that the user equipment is allowed to access, determining a service access time delay requirement of each network slice that the user equipment is allowed to access according to the service type of each network slice that the user equipment is allowed to access, and selecting a frequency that supports a network slice that the user equipment is allowed to access with a service access time delay requirement lower than or equal to a service access time delay threshold as the first candidate frequency for slice-based cell reselection.

6. The method according to claim 2, wherein deriving the first priority frequency for slice-based cell reselection from the plurality of first candidate frequencies for slice-based cell reselection according to the network slice information and the slice-based cell reselection information comprises:

selecting a first candidate frequency for slice-based cell reselection with a highest slice-based cell reselection frequency priority as the first priority frequency for slice-based cell reselection; and selecting, if the first priority frequency for slice-based cell reselection derived based on the highest slice-based cell reselection frequency priority is more than one, a first candidate frequency for slice-based cell reselection with a highest cell reselection frequency priority as the first priority frequency for slice-based cell reselection.

7. The method according to claim 2, wherein deriving the first priority frequency for slice-based cell reselection from the plurality of first candidate frequencies for slice-based cell reselection according to the network slice information and the slice-based cell reselection information comprises:

determining a slice priority weighted value of each network slice that the user equipment is allowed to access by obtaining a network slice priority of each network slice that the user equipment is allowed to access;

obtaining a weighted slice-based cell reselection frequency priority of each first candidate frequency for slice-based cell reselection according to the slice priority weighted value of each network slice that the user equipment is allowed to access and the slice-based cell reselection frequency priority of each first candidate frequency for slice-based cell reselection;

selecting a first candidate frequency for slice-based cell reselection with a highest weighted slice-based cell reselection frequency priority as the first priority frequency for slice-based cell reselection; and selecting, if the first priority frequency for slice-based cell reselection derived based on the highest weighted slice-based cell reselection frequency priority is more than one, a first candidate frequency for slice-based cell reselection with a highest cell reselection frequency priority as the first priority frequency for slice-based cell reselection.

8. The method according to claim 2, wherein deriving the first priority frequency for slice-based cell reselection from the plurality of first candidate frequencies for slice-based cell reselection according to the network slice information and the slice-based cell reselection information comprises at least one of:

determining a service type of each network slice that the user equipment is allowed to access, determining a service usage degree of the user equipment for each network slice that the user equipment is allowed to access according to a service trigger frequency of the user equipment for each network slice that the user equipment is allowed to access, and selecting a first candidate frequency for slice-based cell reselection with a highest slice-based cell reselection frequency priority in the network slice that the user equipment is allowed to access with a service usage degree higher than or equal to a service usage degree threshold as the first priority frequency for slice-based cell reselection; or determining a service type of each network slice that the user equipment is allowed to access, determining a service access time delay requirement of each network slice that the user equipment is allowed to access according to the service type of each network slice that the user equipment is allowed to access, and selecting a first candidate frequency for slice-based cell reselection with a highest slice-based cell reselection frequency priority in the network slice that the user equipment is allowed to access that supports a service access time delay requirement lower than or equal to a service access time delay threshold as the first priority frequency for slice-based cell reselection.

9. The method according to claim 1, further comprising:

determining, when the user equipment initiates a service for a first slice, to support triggering slice-based cell reselection when the user equipment initiates a service;

determining that the user equipment needs to trigger slice-based cell reselection;

selecting a frequency that supports the first slice as a second candidate frequency for slice-based cell reselection;

selecting a second candidate frequency for slice-based cell reselection with a highest slice-based cell reselection frequency priority of the first slice as a second priority frequency for slice-based cell reselection;

selecting, if the second priority frequency for slice-based cell reselection derived based on the highest slice-based cell reselection frequency priority of the first slice is more than one, a second candidate frequency for slice-based cell reselection with a highest cell reselection frequency priority as the second priority frequency for slice-based cell reselection; and reselecting from the suitable cell for camping to a first cell on the second priority frequency for slice-based cell reselection, and initiating random access in the first cell.

10. The method according to claim 9, wherein determining to support triggering slice-based cell reselection when the user equipment initiates a service, comprises at least one of:

determining, if the user equipment receives a first information element sent by a network device and the first information element indicates to support triggering slice-based cell reselection when the user equipment initiates a service, to support triggering slice-based cell reselection when the user equipment initiates a service; or determining, if the first information element indicates to support triggering slice-based cell reselection when the user equipment initiates a service of a first specific slice and the first specific slice comprises the first slice, to support triggering slice-based cell reselection when the user equipment initiates a service.

11. The method according to claim 10, further comprising at least one of:

if the first information element indicates not to support triggering slice-based cell reselection when the user equipment initiates a service, determining not to support triggering slice-based cell reselection when the user equipment initiates a service, and initiating random access to the suitable cell for camping;

if the first information element indicates not to support triggering slice-based cell reselection when the user equipment initiates a service of the specific slice, determining not to support triggering slice-based cell reselection when the user equipment initiates a service, and initiating random access to the suitable cell for camping;

if the first information element indicates to support triggering slice-based cell reselection when the user equipment initiates a service of the first specific slice and the first specific slice does not comprise the first slice, determining not to support triggering slice-based cell reselection when the user equipment initiates a service, and initiating random access to the suitable cell for camping; or if the user equipment does not receive the first information element sent by the network device, determining not to support triggering slice-based cell reselection when the user equipment initiates a service, and initiating random access to the suitable cell for camping.

12. The method according to claim 9, wherein determining that the user equipment needs to trigger slice-based cell reselection comprises at least one of:

if the first priority frequency for slice-based cell reselection does not support the first slice, determining that the user equipment needs to trigger slice-based cell reselection;

if the first priority frequency for slice-based cell reselection supports the first slice, and the slice-based cell reselection frequency priority of the first slice corresponding to the first priority frequency for slice-based cell reselection is less than a priority threshold, determining that the user equipment needs to trigger slice-based cell reselection; or if the first priority frequency for slice-based cell reselection supports the first slice, and the first priority frequency for slice-based cell reselection is not a priority frequency of the first slice, determining that the user equipment needs to trigger slice-based cell reselection.

13. The method according to claim 12, further comprising at least one of:

if the first priority frequency for slice-based cell reselection supports the first slice, and the slice-based cell reselection frequency priority of the first slice corresponding to the first priority frequency for slice-based cell reselection is greater than the priority threshold, determining that the user equipment does not need to trigger slice-based cell reselection, and initiating the service of the first slice in the suitable cell for camping;

if the first priority frequency for slice-based cell reselection supports the first slice, and the first priority frequency for slice-based cell reselection is the priority frequency of the first slice, determining that the user equipment does not need to trigger slice-based cell reselection, and initiating the service of the first slice in the suitable cell for camping.

14. The method according to claim 9, further comprising:

remapping, if there is no frequency that supports the first slice, the first slice to a second slice;

selecting a frequency that supports slice remapping access from a frequency that supports the second slice as a third priority frequency for slice-based cell reselection; and reselecting from the suitable cell for camping to the second cell on the third priority frequency for slice-based cell reselection, and initiating random access in the second cell.

15. The method according to claim 14, wherein remapping the first slice to the second slice comprises at least one of:

determining, if the user equipment receives a second information element sent by the network device and the second information element indicates to support the user equipment to trigger cell reselection and initial access based on slice remapping, that the user equipment supports a slice remapping function, and remapping the first slice to the second slice; or determining, if the second information element indicates to support the user equipment to trigger cell reselection and initial access based on slice remapping for a service of a second specific slice and the second specific slice comprises the first slice, that the user equipment supports the slice remapping function, and remapping the first slice to the second slice.

16. The method according to claim 15, further comprising at least one of:

if the second information element indicates not to support the user equipment to trigger cell reselection or initial access based on slice remapping, determining that the user equipment does not support the slice remapping function, and initiating random access to the suitable cell for camping;

if the second information element indicates not to support the user equipment to trigger cell reselection or initial access based on slice remapping for the service of the second specific slice, determining that the user equipment does not support the slice remapping function, and initiating random access to the suitable cell for camping;

if the second information element indicates to support the user equipment to trigger cell reselection or initial access based on slice remapping for the service of the second specific slice, and the second specific slice does not include the first slice, determining that the user equipment does not support the slice remapping function, and initiating random access to the suitable cell for camping; or if the user equipment does not receive the second information element sent by the network device, determining that the user equipment does not support the slice remapping function, and initiating random access to the suitable cell for camping.

17. The method according to claim 14, wherein initiating random access in the second cell comprises:

sending an access request to the network device in a process of initiating random access in the second cell, wherein the access request carries a slice remapping indication, so that the network device selects to accept or reject the access request of the user equipment according to the slice remapping indication.

18. An electronic device, comprising:

one or more processors; and a storage apparatus, configured to store one or more programs, wherein when the one or more programs are executed by the one or more processors, the one or more processors are directed to cause the electronic device to:

obtain network slice information and slice-based cell reselection information;

derive a first priority frequency for slice-based cell reselection according to the network slice information and the slice-based cell reselection information; and perform cell reselection on the first priority frequency for slice-based cell reselection, and identifying a suitable cell for camping on the first priority frequency for slice-based cell reselection;

derive a first candidate frequency for slice-based cell reselection according to the network slice information and the slice-based cell reselection information:

select, if the first candidate frequency for slice-based cell reselection derived by the user equipment comprises a single frequency, the first candidate frequency for slice-based cell reselection as the first priority frequency for slice-based cell reselection; and derive, if the first candidate frequency for slice-based cell reselection derived by the user equipment comprises a plurality of first candidate frequencies, the first priority frequency for slice-based cell reselection from the plurality of first candidate frequencies for slice-based cell reselection according to the network slice information and the slice-based cell reselection information.

19. A non-transitory computer-readable storage medium, wherein the computer-readable storage medium stores a computer program, and when the computer program is executed by a processor, a method for slice-based cell reselection is implemented, the method comprising:

obtaining network slice information and slice-based cell reselection information;

deriving a first priority frequency for slice-based cell reselection according to the network slice information and the slice-based cell reselection information; and performing cell reselection on the first priority frequency for slice-based cell reselection, and identifying a suitable cell for camping on the first priority frequency for slice-based cell reselection;

wherein deriving the first priority frequency for slice-based cell reselection according to the network slice information and the slice-based cell reselection information, comprises:

deriving a first candidate frequency for slice-based cell reselection according to the network slice information and the slice-based cell reselection information;

selecting, if the first candidate frequency for slice-based cell reselection derived by the user equipment comprises a single frequency, the first candidate frequency for slice-based cell reselection as the first priority frequency for slice-based cell reselection; and deriving, if the first candidate frequency for slice-based cell reselection derived by the user equipment comprises a plurality of first candidate frequencies, the first priority frequency for slice-based cell reselection from the plurality of first candidate frequencies for slice-based cell reselection according to the network slice information and the slice-based cell reselection information.

* * * * *